United States Patent [19]

Majefski

[11] 3,934,201
[45] Jan. 20, 1976

[54] LOW POWER CONSUMPTION STEREO TRANSMITTER AND RECEIVER SYSTEM

[76] Inventor: Richard L. Majefski, Rte. 1, Combs, Ark. 72721

[22] Filed: Mar. 22, 1974

[21] Appl. No.: 454,018

[52] U.S. Cl. ............... 325/36; 84/1.24; 179/15 BT
[51] Int. Cl.² ......................................... H04B 1/00
[58] Field of Search ............... 325/36, 49, 47, 59; 179/15 BT, 15 BP; 330/28, 110; 84/1.01, 1.11, 1.19, 1.24; 179/1 M, 1 G, 1 GA, 1 GP

[56] References Cited
UNITED STATES PATENTS

| | | | |
|---|---|---|---|
| 3,069,505 | 12/1962 | Collins | 179/15 BT |
| 3,114,004 | 12/1963 | Schroeder | 179/15 BT |
| 3,283,079 | 11/1966 | Dixon | 179/15 BT |
| 3,534,172 | 10/1970 | Weeda | 325/36 |
| 3,714,595 | 1/1973 | Denenberg et al. | 179/15 BT |

OTHER PUBLICATIONS
Albert S. Jackson, "Analog Computation" (1960) pp. 38, 49, 196.

Primary Examiner—Albert J. Mayer
Assistant Examiner—Robert Hearn
Attorney, Agent, or Firm—Mason, Fenwick & Lawrence

[57] ABSTRACT

A low power consumption, compact portable stereo radio transmitter and a receiver therefor, the transmitter having two audio processing channels each for receiving inputs from two stereo pickup stations and including amplifier circuits with selector switches providing a mode of even harmonic generation, a mode of odd harmonic generation, and a mode of undistorted amplification, a 38 KHz oscillator, flip flop coupled to the oscillator to provide a 19 KHz pilot signal, a difference amplifier and a balanced mixer to produce a double-sideband suppressed carrier signal centered on 38 KHz, and an amplifier for combining the balanced mixer output, the pilot signal and the two channel output and modulating a carrier signal. The receiver includes amplifier, detector, and decoder circuitry to receive the radio signals from the transmitter and produce stereo audio signals for driving a standard stereo amplifier.

11 Claims, 2 Drawing Figures

LOW POWER CONSUMPTION STEREO TRANSMITTER AND RECEIVER SYSTEM

BACKGROUND AND OBJECTS OF THE INVENTION

The present invention relates in general to an electronic transmitter and receiver system involving a multi channel transmitter of extremely low power consumption and compact size, capable of fitting in the palm of the hand, which is completely portable and capable of high fidelity stereo radio transmission, and a separate receiver to be linked by radiant energy transmission with the transmitter for demodulating the transmitted signal, decoding, and driving at least two channels of amplification.

The transmitter and receiver system of the present invention has particular application to audio frequency processing for electrical musical instruments at the instrument. As a specific example, the palm size stereo transmitter may be provided with two audio processing channels to provide stereo pickups from a guitar or other musical instrument or pickups from two microphones receiving sound from a musical instrument, and which provides radio transmission of the two channels as high fidelity stereo radio signals to the receiving device. The receiving device is capable of demodulating the transmitted signal, decoding the stereo multiplex modulation, and driving two channels of amplification to provide a high fidelity stero amplified audio output.

The extremely low power consumption and compact character of the transmitting device provides audio frequency processing for electrical musical instruments at the instrument, by a radio linked system with the receiver, amplifier, permitting removal of the umbilical cord customarily provided between the musical instrument and its amplifier. This allows a degree of freedom long enjoyed by the more classical acoustical instruments, but not available in the field of electrical musical instruments heretofore.

In general, the transmitter comprises a pair of amplifiers forming audio processing circuitry which provides selection between one mode of undistorted amplification, one mode of odd harmonic generation, and one mode of even harmonic generation. Provision is made for more than one input per channel. A doublesideband suppressed carrier signal is formed from the output of an oscillator and the difference between the signals in the two channels, is combined with signals from the two channels and a pilot signal. This combination is employed to modulate a voltage controlled oscillator whose center frequency is the carrier frequency, to provide the signal radiated from the antenna to the receiver. The receiver includes an amplifier which receives the signal from its associated antenna, amplifies it to the limiting input level of a demodulator, and the stereo composite signal of the demodulator is decoded by an amplifier which provides two distinct channels of high fidelity audio signals capable of driving a standard stereo amplifier.

By the judicious circuit design, an extremely compact portable small size high fidelity stereo transmitter is provided capable of being carried by the musical instrument or by the instrumentalist, for example, in his pocket, and operated for reasonable periods of time, to provide high fidelity stereo amplification through a radio link to a stereo amplifier without requiring direct mechanical or electrical connection between the instrument and the amplifier.

Other objects, advantages and capabilities of the present invention will become apparent from the following detailed description, taken in conjunction with the accompanying drawings illustrating a preferred embodiment of the invention.

DETAILED DESCRIPTION OF A PREFERRED EMBODIMENT

Figure 1:
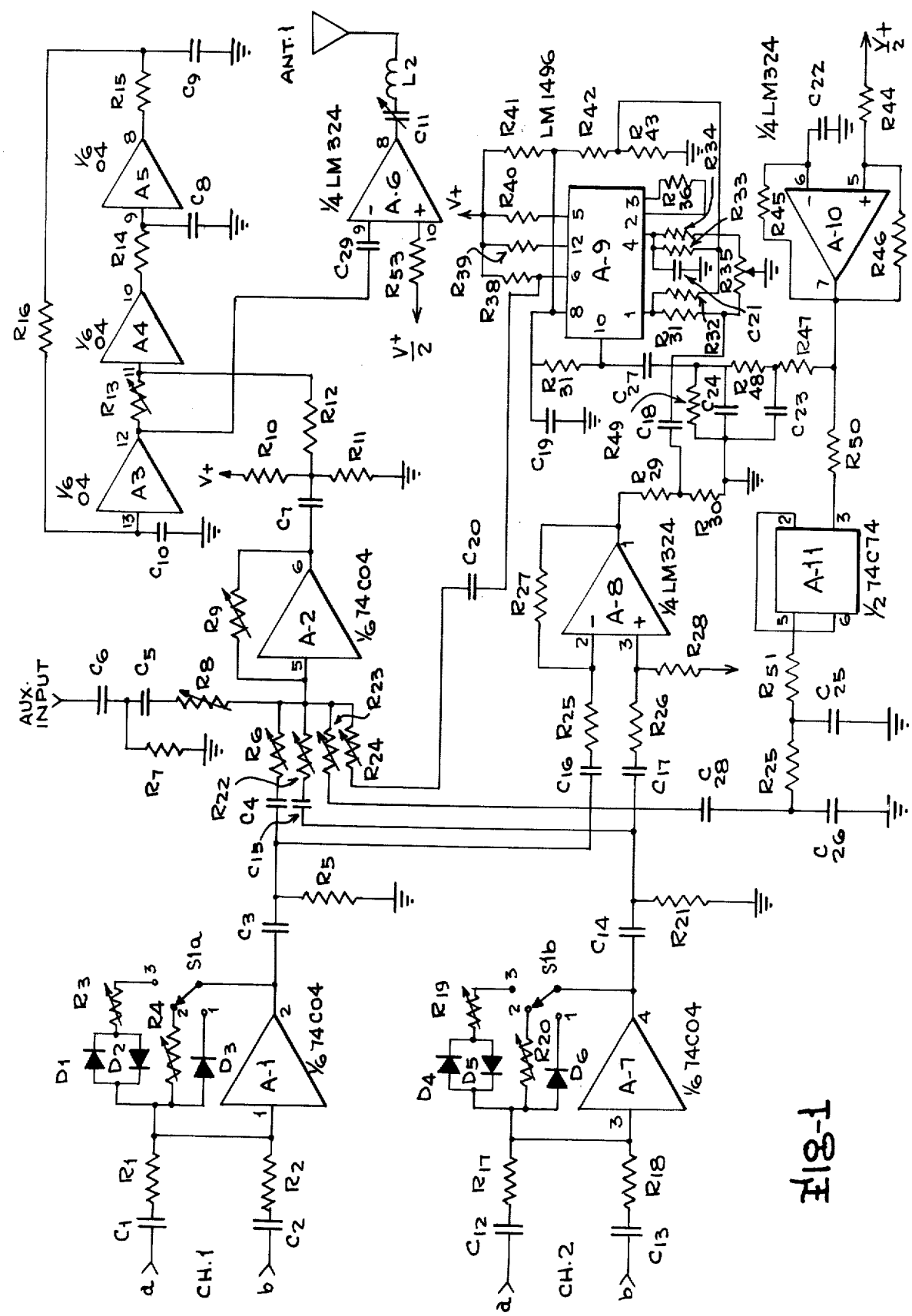
FIG. 1 is a schematic diagram of the stereo transmitter circuit embodying the present invention.

Referring to the schematic diagram, shown in FIG. 1, of the two channel transmitter of the present invention, the transmitter is provided with two inputs, in the form of input terminals, jacks or similar coupling devices, for each of two channels, the inputs for the first channel being designated CH1$a$ and CH1$b$, and the two inputs for the second channel being designated CH2$a$ and CH2$b$. These inputs are provided to receive audio signals from various sources, such as musical instruments pickups, microphones, digital and analog data generators, audio frequency synthesizers, musical synthesizers including keyboard and multicontrol instruments, and the like. Ordinarily, the output frequency spectrum of such devices occurs in the 20 Hz to 20 KHz range. The audio signals supplied to the two inputs for the first channel are coupled either through capacitor C1 from input CH1$a$ or through capacitor C2 from input CH1$b$ through resistors R1 and R2 connected to the input of the audio processing amplifier A1, formed for example of one-sixth of a 74C04 "hex inverter" integrated circuit device manufactured by National Semiconductor Corp., by connection for example to pins 1 and 2 on such integrated circuit device. The switch S1$a$ provides selection of one of various feedback circuits which determines the transfer characteristics of the amplifier A1. The switch provides selection between one mode of undistorted amplification, one mode of odd harmonic generation, and one mode of even harmonic generation. In position 1 of the switch S1$a$, the diode D3 provides positive halfwave rectification of the input signals yielding their fundamental frequencies and even harmonics. In position 2 of switch S1$a$, linear amplification occurs, and in position 3 of switch S1$a$, diodes D1 and D2 provide positive and negative limiting of the input signals yielding their fundamental frequencies and odd harmonics. Thus amplifier A1 can be used as a linear amplifier or as a harmonic generator with amplification.

Similarly, signals at the inputs CH2$a$ and CH2$b$ are coupled through capacitor C12 and resistor R17 or capacitor C13 and resistor R18 to the input of audio processing amplifier A7, also formed for example by one-sixth of the 74C04 integrated circuit by connection to pins 3 and 4. The switch S1$b$ provides selection of the processing of the signals by amplifier A7 in the same manner as the switch S1$a$ associated with amplifier A1.

The output of Amplifier A1 is connected to a pre-emphasis network, formed of capacitor C3 and resistor R5, providing a high-pass filter which serves to accentuate the frequencies above 2KHz to yield an increase in signal to noise ratio for the entire system. The output of the pre-emphasis network is coupled through capacitors C4 to resistor R6, which is connected to the input of the summing amplifier A2. Similarly, the output of amplifier A7 is connected to a pre-emphasis network formed of capacitor C14 and resistor R21, acting in a similar manner to the network formed by capacitor C3 and resistor R5, and the output of this pre-emphasis network is coupled through capacitor C15 and resistor R22 to the input of the summing amplifier A2. The switches S1a and S1b are mechanically coupled to produce idential feedback circuits for amplifiers A1 and A7.

Signals from the pre-emphasized channel CH1 are also coupled through the capacitor C16 and resistor R25 to the inverting input of an operational amplifier A8, which may be formed of onefourth of an LM324 National Semiconductor Corp. quad operational amplifiers integrated circuit, while the pre-emphasized signals from the second channel CH2 are coupled through the capacitor C17 and resistor R26 to the non-inverting input of the operational amplifier A8. The gain of the amplifier A8 is determined by the ratio of resistor R27 to resistor R25 and the ratio of resistor R28 to resistor R26. These ratios are identical in the illustrated embodiment, so that the output of the operational amplifier A8 yields a voltage wave form that is the difference between the pre-emphasized channel CH1 and the pre-emphasized channel CH2. The output of the operational amplifier A8 is connected to a voltage divider formed of resistor R29 and resistor R30, which reduces the amplitude of the difference signal to a level compatible with signal input of balanced modulator A9, formed for example of an LM1496 integrated circuit produced by National Semiconductor Corp. The output of the voltage divider formed of R29 and R30 is coupled through capacitor C18 to resistor R31 connected to the non-inverting signal input of the balanced modulator A9 at pin 1. Capacitor C21 connected to pin 4 establishes an alternating current ground on the inverting signal input of balanced modulator A9. Resistors R31 and R34 together with potentiometer R35 balance the signal input stage of modulator A9 and resistor R35 serves as a carrier null adjustment. Resistors R31, R32, R37, R40, R41, R42 and R43 comprise a voltage divider that is utilized to bias the various stages of the balanced modulator A9.

Amplifier A10, formed for example of another onefourth of the LM324 integrated circuit, is utilized as a 38 KHz square wave oscillator with frequency of oscillation determined primarily by the time constant of resistor R45 and capacitor C22 and somewhat by the amount of hysteresis caused by the positive feedback through resistor R46. Resistor R44 serves to bias the input stage of amplifier A10. The output of amplifier A10 is fed through a two stage resistor-capacitor low pass filter comprised of resistor R47 and capacitor C23 for the first stage and resistor R48 and capacitor C24 for the second stage and a voltage divider comprised of resistors R47, R48, and R49 which reduces the amplitude of the filtered oscillation to a level compatible with the carrier input of the balanced modulator A9. This signal is coupled through capacitor C27 to the inverting carrier input of balanced modulator A9. Capacitor C19 establishes an alternating current ground on the non-inverting carrier input of modulator A9. Resistors R38 and R39 serve as the collector loads for the output transistors incorporated in the balanced modulator A9. The output at resistor R38 is coupled through capacitor C20 to resistor R24 connected to the input of the summing amplifier A2. The square wave oscillation output of oscillator A10 is fed through resistor R50 to the flip flop A11, also formed for example, from one-half of a 74C74 integrated circuit, which is connected to divide its input frequency by two to produce a 19 KHz output. The output of the divider flip flop A11 is fed through a two stage resistor-capacitor low pass filter formed of resistor R51 and capacitor C25 for the first stage and resistor R52 and capacitor C26 for the second stage. The output of this filter is coupled through capacitor C28 to resistor R23 which is connected to the input of the summing amplifier A2.

An auxiliary input is also provided for the unit which will appear in both channels CH1 and CH2. Audio signals at the auxiliary input pass through a pre-emphasis network formed of capacitor C6 and resistor R7. The output of this network is coupled through capacitor C5 to resistor R8 which is connected to the input of the summing amplifier A2. Thus, there may be applied to the input of the summing amplifier A2 an auxiliary input coupled through the resistor R8, the first channel signals from channel CH1 through resistor R6, the second channel signals from channel CH2 through resistor R22, a 19 KHz pilot signal applied through resistor R23, and the difference of channel Ch1 and CH2 on a 38 KHz double-sideband suppressed carrier signal applied through resistor R24. These signals are adjusted to their properly proportioned levels with resistors R8, R6, R22 and R24. The overall amplitude of these signals is adjusted by resistor R9. This level determines the total frequency deviation of the voltage controlled oscillator formed of amplifiers A3, A4 and A5, each formed of one-sixth of the 74C04, connected as indicated in the drawing. The output of the summing amplifier A2 is coupled through capacitor C7 to a voltage divider formed of resistors R10 and R11, which determine the center frequency of the voltage controlled oscillator formed by amplifiers A3, A4 and A5. This direct current voltage and the alternating current voltage from capacitor C7 are applied through resistor R12 to the resistor-capacitor phase shift oscillator formed of amplifiers A3, A4 and A5. The output of the oscillator is coupled through capacitor C29 to the inverting input of the operational amplifier A6. The non-inverting input of amplifier A6 is connected through resistor R53 to a proper biasing voltage. The output of the amplifier A6 is filtered through a series tuned circuit capacitor C11 and an inductor L1, the output of the filter formed by C11 and L1 being connected to the antenna system.

Representative values of the circuit elements for the transmitter of FIG. 1, and one satisfactory example are as follows:

| | | | |
|---|---|---|---|
| R 1 = 47K | R27 = 10K | R52 = 10K | C22 = 100pfd |
| R 2 = 47K | R28 = 10K | R53 = 47K | C23 = 470pfd |
| R 3 = 470K,var. | R29 = 6.8K | | C24 = 470pfd |
| R 4 = 470K,var. | R30 = 3.3K | | C25 = .001 |
| R 5 = 68K | R31 = 10K | C 1 = .1 | C26 = .001 |
| R 6 = 100K,var. | R32 = 100 | C 2 = .1 | C27 = .1 |
| R 7 = 68K | R33 = 100 | C 3 = .001 | C28 = .1 |
| R 8 = 100K,var. | R34 = 10K | C 4 = .1 | C29 = .001 |
| R 9 = 100K,var. | R35 = 50K,var. | C 5 = .1 | |
| R10 = 1K | R36 = 1K | C 6 = .001 | |
| R11 = 10K | R37 = 50 | C 7 = .1 | D 1 = 1N914 |
| R12 = 27K | R38 = 3K | C 8 = 60pfd | D 2 = 1N914 |
| R13 = 50K,var. | R39 = 3K | C 9 = 60pfd | D 3 = 1N914 |
| R14 = 10K | R40 = 10K | C10 = 60pfd | D 4 = 1N914 |
| R15 = 10K | R41 = 1.3K | C11 = .001 | D 5 = 1N914 |
| R16 = 10K | R42 = 820 | C12 = .1 | D 6 = 1N914 |

-continued

| | | | |
|---|---|---|---|
| R17 = 47K | R43 = 1K | C13 = .1 | |
| R18 = 47K | R44 = 100K | C14 = .001 | |
| R19 = 470K,var. | R45 = 20K | C15 = .1 | L 1 = 100μh |
| R20 = 470K,var. | R46 = 20K | C16 = .1 | |
| R21 = 68K | R47 = 10K | C17 = .1 | |
| R22 = 100K,var. | R48 = 10K | C18 = 10pfd | |
| R23 = 100K,var. | R49 = 1K | C19 = .1 | |
| R24 = 100K,var. | R50 = 1K | C20 = .1 | |
| R25 = 10K | R51 = 10K | C21 = 25μfd | |
| R26 = 10K | | | |

Figure 2:
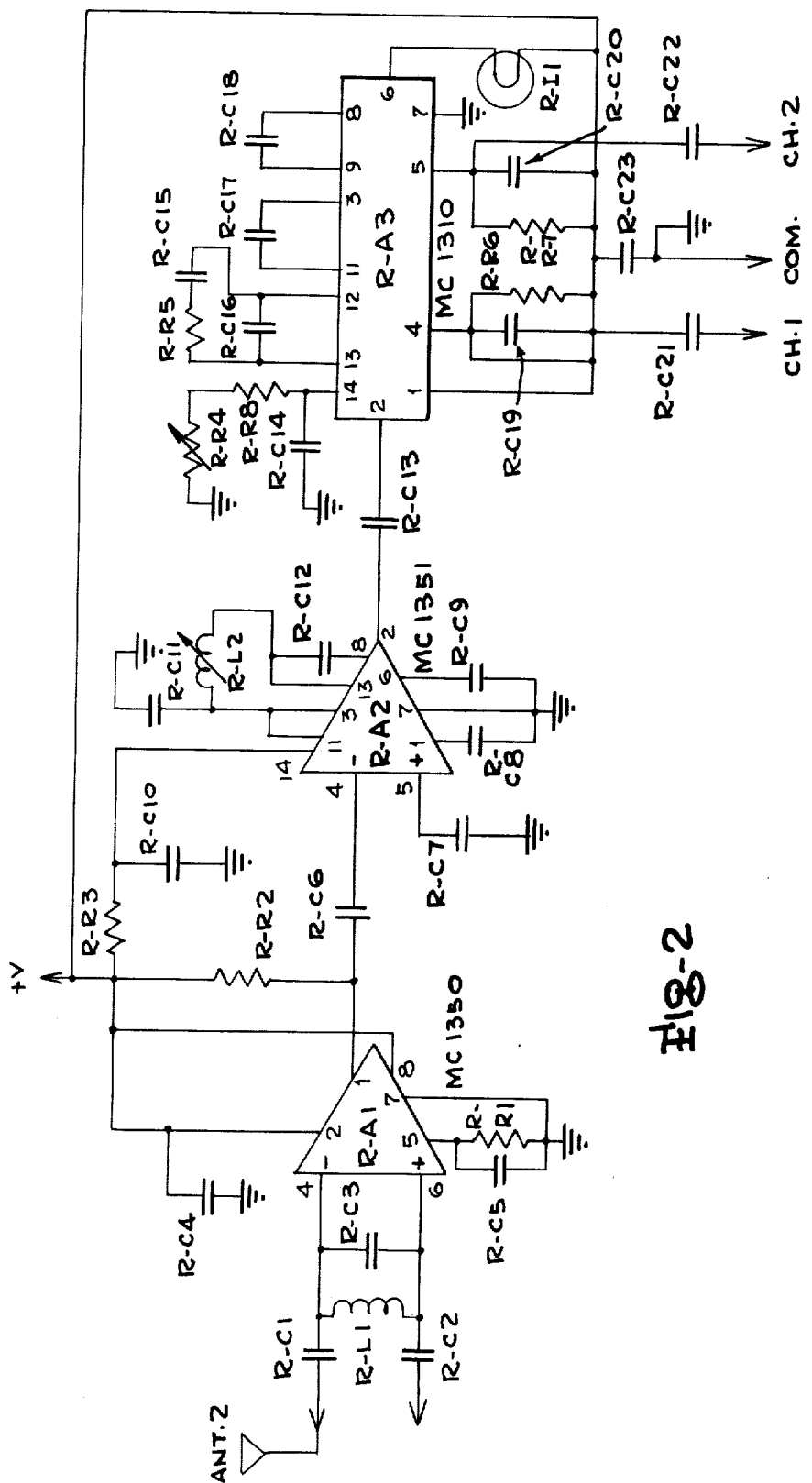
FIG. 2 is a schematic diagram of the stereo receiver circuit to be used with the stereo transmitter of FIG. 1 in accordance with the present invention.

A schematic diagram of a receiver embodying the present invention is illustrated in FIG. 2. Radio frequency signals from the receiving system, indicated schematically at Ant-2 in FIG. 2, are coupled differentially through capacitor R-C1 to the non-inverting input of a radio frequency amplifier R-A1 and through capacitor R-C2 to the non-inverting input of amplifier R-A1. The inductor R-L1 and capacitor R-C3 form a parallel resonant circuit which limits the frequency range of the radio frequency signals appearing at the differential input of the amplifier R-A1. Resistor R-R1 and capacitor R-C5 serve to bias the automatic gain control section of amplifier R-A1. Resistor R-R2 serves as the collector load for one of the output transistors of the amplifier R-A1. The amplifier R-A1 may be an MC1350 monolithic IF amplifier integrated circuit supplied by Motorola Semiconductor Products, Inc.

The output of the amplifier R-A1 coupled through Capacitor R-C6 to the inverting input of the amplifier section of a dectector R-A2, also formed, for example, from an MC1351 FM detector, limiter and amplifier integrated circuit. The noninverting input of detector R-A2 is bypassed to ground through capacitor R-C7. Resistor R-R3 limits the current to the voltage regulator section of the detector R-A2. Inductor R-L2 and capacitor R-C12 provide a 90 degree phase shift of the input signals for application to the detector section of detector R-A2 along with the non-phase shifted input signals to provide detection of the transmitted information. Capacitor R-C8 along with circuitry internal to the MC1351 integrated circuit form a low filter which is connected to the output of the detector section of detector R-A2. The output of detector R-A2 is coupled through capacitor R-C13 to the decoder R-A3, which may be an MC1310 integrated circuit. Decoder R-A3 includes a voltage controlled oscillator section connected to resistors R-R4, R-R8 and capacitor C-C14 to determine the oscillation frequency of the oscillator section at 76 KHz, and resistor R-R5 and capacitors R-C15 and R-C16 determine the low pass filter characteristics in a phase-locked loop section of the decoder R-A3. Capacitor R-C17 is a coupling capacitor between input amplifier and modulator sections of the decoder R-A3. Capacitor R-C18 determines the filter characteristics for the stereo switch level detector section of the decoder which indicates whether a stereo signal is being received by the decoder R-A3. Resistor R-R6 and capacitor R-C19 form a de-emphasis network for the first receiver channel R-CH1 and resistor R-R7 and capacitor R-C20 form the de-emphasis network for the second receiver channel R-CH2. Capacitors R-C21 and R-C22 are coupling capacitors, and capacitors R-C4, R-C9, R-C10, R-C11 serve as bias supply alternating voltage bypasses. The tuning light R-I1 connected to the decoder pin 6 indicates when a stereo signal is being received.

The decoder R-A3 therefore decodes the stereo composite signal supplied to it from the output of the demodulator R-A2 and provides two distinct channels of high fidelity audio signals on the output leads marked R-Ch1 and R-CH2 for driving a standard stereo amplifier.

Representative values of the circuit elements for a satisfactory example of the receiver of FIG. 2 are as follows:

| | |
|---|---|
| R-R 1 = 5.1K | R-R 5 = 1K |
| R-R 2 = 680 | R-R 6 = 3.9K |
| R-R 3 = 47 | R-R 7 = 3.9K |
| R-R 4 = 5K, var. | |
| R- C 1 = .001 | R-C13 = 2 μfd |
| R- C 2 = .001 | R-C14 = 470pfd |
| R- C 3 = 100pfd | R-C15 = .5μfd |
| R- C 4 = .05 | R-C16 = .25μfd |
| R- C 5 = .05 | R-C17 = .05 |
| R- C 6 = .001 | R-C18 = .25 |
| R- C 7 = .1 | R-C19 = .02 |
| R- C 8 = .05 | R-C20 = .02 |
| R- C 9 = .1 | R-C21 = .05 |
| R- C10 = .1 | R-C22 = .05 |
| R- C11 = .1 | R-C23 = .1 |
| R- C12 = 75pfd | |

R-I1 = 12v, 25ma Lamp
R-L1 = 1mh
R-L2 = 1mh

What is claimed is:

1. A low power consumption, highly compact portable stereo radio transmission and receiving system for multi-channel transmission of musical signals and the like from a pair of stereo pickup stations to a nearby receiver-amplifier to provide a high fidelity stereo amplified audio output, comprising a compact portable stereo radio transmitter unit including a pair of audio processing channels each comprising an audio processing amplifier circuit having plural inputs to each amplifier circuit, said audio processing amplifier circuits each having means providing one mode of undistorted amplification, one mode of even harmonic generation and one mode of odd harmonic generation wherein even harmonics and odd harmonics respectively are added to the waveforms at the amplifier input, selector switch means coupled to each said audio processing amplifier circuits permitting selection between said three modes, a difference amplifier circuit coupled to the outputs of said audio processing channels for producing a difference output signal which is the difference between the output signals from said two channels, a first oscillator for generating a first frequency waveform, a balanced mixer circuit to which are applied said difference output signal and said first frequency waveform to produce a double-sideband suppressed carrier signal centered on the frequency of said first frequency waveform, a second oscillator including amplifier means for generating a carrier frequency signal, means for modulating said carrier frequency signal with a modulating signal combined from the outputs from said two channels and said double-sideband suppressed carrier signal including a summing amplifier receiving the output signals from both of said channels and the double-sideband suppressed carrier signal from said balanced mixer and providing a combined output which is applied to said second oscillator to modulate the carrier frequency signal, divider means receiving said first frequency waveform for producing a pilot signal having a frequency which is one-half the frequency of the first frequency waveform, means for applying said pilot signal to said summing amplifier to be combined with output signals from both of said channels and said double-sideband suppressed carrier signal including low pass filter means connected to the output of said divider means for removing the harmonic content of said output from said divider means, and antenna means coupled to the modulated carrier frequency signal for radiating the same to the receiver-amplifier coupled to the transmitter only by a radio link.

2. A stereo radio transmission and receiving system as defined in claim 1, wherein said second oscillator is a voltage controlled oscillator whose center frequency is the carried frequency.

3. A stereo ratio transmission and receiving system as defined in claim 1 wherein said first oscillator is a square wave oscillator producing a square wave output having a frequency of about 38 KHz and said divider means is a flip flop circuit producing a pilot signal having a frequency of about 19 KHz.

4. A stereo radio transmission and receiving system as defined in claim 1, wherein the amplifiers for said two amplifier circuits of said two channels and for said summing amplifier and said second oscillator are all formed by transistor subsections of a single hex inverter integrated circuit element.

5. A stereo radio transmission and receiving system as defined in claim 1, wherein said receiver-amplifier comprises a radio frequency amplifier having inverting and non-inverting inputs coupled to antenna means to receive radio frequency signals from the transmitter, means coupling the output from said radio frequency amplifier to a detector section formed of a detector and limiting amplifier integrated circuit element, and a phase locked loop FM stereo demodulator integrated circuit element coupled to the output of said detector section for decoding stereo composed signals applied to it from the detector section and providing two channels of audio signals for driving a conventional stereo amplifier.

6. A stereo radio transmission and receiving system as defined in claim 5, wherein said radio frequency amplifier is a monolithic 1F amplifier silicon integrated circuit element.

7. A stereo radio transmission and receiving system for multi-channel transmission of musical signals and the like from a pair of stereo pickup stations to a nearby receiver-amplifier to provide a high fidelity stereo amplified audio output, comprising a compact portable stereo radio transmitter unit including a pair of audio processing channels each comprising an audio processing amplifier circuit having plural inputs to each amplifier circuit, said audio processing amplifier circuits each having means providing one mode of undistorted amplification, one mode of even harmonic generation and one mode of odd harmonic generation wherein even harmonics and odd harmonics respectively are added to the waveforms at the amplifier input, selector switch means coupled to each said audio processing amplifier circuits permitting selection between said three modes, a difference amplifier circuit coupled to the outputs of said audio processing channels for producing a difference output signal which is the difference between the output signals from said two channels, a first oscillator for generating a first frequency waveform, a balanced mixer circuit to which are applied said difference output signal and said first frequency waveform to produce a double-sideband suppressed carrier signal centered on the frequency of said first frequency waveform, a second oscillator including amplifier means for generating a carrier frequency signal, means for modulating said carrier frequency signal with a modulating signal combined from the outputs from said two channels and said double-sideband suppressed carrier signal including a summing amplifier receiving the output signals from both of said channels and the double-sideband suppressed carrier signal from said balanced mixer and providing a combined output which is applied to said second oscillator to modulate the carrier frequency signal, divider means receiving said first frequency waveform for producing a pilot signal having a frequency which is one-half the frequency of said first frequency waveform and means for applying said pilot signal to said summing amplifier to be combined with said output signals from both of said channels and said double-sideband suppressed carrier signal, said first oscillator being a square wave oscillator and said divider means being a flip flop circuit, and antenna means coupled to the modulated carrier frequency signal for radiating the same to the receiver-amplifier coupled to the transmitter only by a radio link.

8. A stereo radio transmission and receiving system, as defined in claim 7, wherein said second oscillator is a voltage controlled oscillator whose center frequency is the carrier frequency.

9. A stereo radio transmission and receiving system as defined in claim 7 wherein said first oscillator is a square wave oscillator producing a square wave output having a frequency of about 38 KHz and said divider means is a flip flop circuit producing a pilot signal having a frequency of about 19 KHz.

10. A stereo radio transmission and receiving system as defined in claim 7 wherein the amplifiers for said two amplifier circuits of said two channels and for said summing amplifier and said second oscillator are all formed by transistor subsections of a single hex inverter integrated circuit element.

11. A stereo radio transmission and receiving system as defined in claim 7, wherein said receiver-amplifier comprises a radio frequency amplifier having inverting and non-inverting inputs coupled to antenna means to receive radio frequency signals from the transmitter, means coupling the output from said radio frequency amplifier to a detector section formed of a detector and limiting amplifier integrated circuit element, and a phase locked loop FM stereo demodulator integrated circuit element coupled to the output of said detector section for decoding stereo composite signals applied to it from the detector section and providing two channels of audio signals for driving a conventional stereo amplifier.

* * * * *

UNITED STATES PATENT AND TRADEMARK OFFICE
CERTIFICATE OF CORRECTION

PATENT NO. : 3,934,201
DATED : January 20, 1976
INVENTOR(S) : Richard L. Majefski It is certified that error appears in the above-identified patent and that said Letters Patent are hereby corrected as shown below:

In Fig. 2 of the drawings, the channel 1 output lead containing capacitor R-C21 and the lead immediately to the left of capacitor R-C19 should be connected together without either of such leads connecting to the common lead to which the lower ends of resistors R-R6 and R-R7 are connected.

Column 7, line 12, "ratio" should read --radio--.

Signed and Sealed this

Tenth Day of August 1976

[SEAL]

Attest:

RUTH C. MASON
Attesting Officer

C. MARSHALL DANN
Commissioner of Patents and Trademarks